April 29, 1958 J. L. WILLIAMS 2,832,564
GATE VALVE
Filed Oct. 10, 1955

INVENTOR.
JOHN L. WILLIAMS
BY
Buckhorn Cheatham and Blore
ATTORNEYS

# United States Patent Office 2,832,564
Patented Apr. 29, 1958

2,832,564

GATE VALVE

John L. Williams, Portland, Oreg.

Application October 10, 1955, Serial No. 539,539

8 Claims. (Cl. 251—326)

This invention relates to gate valves and particularly to bonnetless gate valves.

A bonnetless gate valve includes a gate blade slidably extending through a packing box into a valve body to fit against a valve seat. In order that the gate blade properly fit against the gate seat, the packing box and the seat must be aligned with one another. Heretofore, alignment of the box and the seat has been obtained by machining them into alignment, or by providing a complicated jig to so hold them while the box is welded in place. Both operations are time consuming and expensive.

In my prior copending application entitled "Stock Valve," Serial No. 248,030, filed September 24, 1951, which has matured into Patent No. 2,720,379, I have disclosed a stock valve having a packing box unit slidably and adjustably mounted in the valve body to overcome the above-mentioned objections.

It is a main object of the present invention to provide a bonnetless gate valve having an adjustable packing box unit, which gate valve is simpler in construction than my prior valve.

In the valve of the present invention, there is a unique packing box device in which the usual follower or packing gland is eliminated, and the box is inverted and has the packing thereof pressed against the upper edges of the valve body by a box mounting means which provides for adjustment or shifting movement of the box relative to the valve body. Thus, the box may be shifted to a position where a desired alignment is established between the box and the valve seat.

Another object of the invention is to provide a gate valve which has a considerably simpler packing assembly than prior valves. More specificaly, it is an object to provide a gate valve having a packing box which is separate from the body and which is in an inverted position relative to the position normally occupied by the packing box of a gate valve, which inverted box presses packing against the body and blade to form effective seals therewith.

Various other objects of the present invention will be apparent from the following description taken in connection with the accompanying drawings, wherin:

Figure 1:
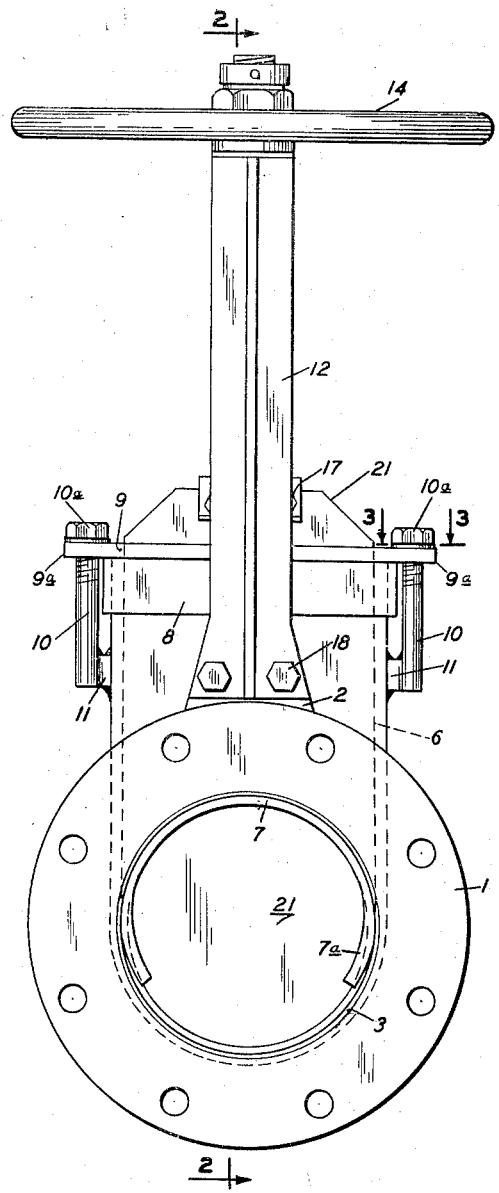
Fig. 1 is an end elevation of a valve embodying the concepts of the present invention.
Figure 2:
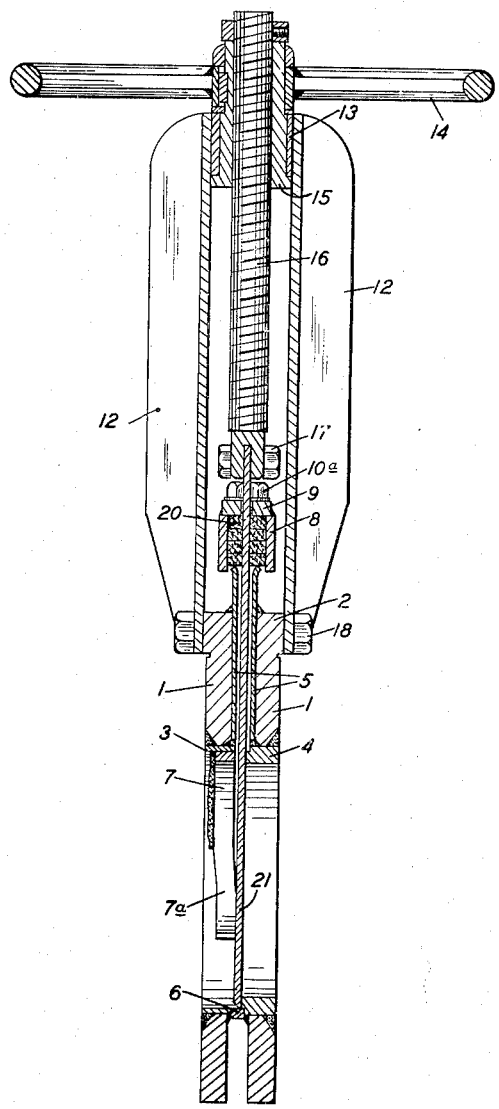
Fig. 2 is a vertical midsectional view through the valve disclosed in Fig. 1.

Referring to the accompanying drawings, the valve includes a pair of annular flanges 1 having a pair of upwardly projecting portions 2 for a purpose to presently appear. A ring 3 is secured within the left-hand flange 1, as the parts are shown in Fig. 2, and a heavier ring 4 is secured within the right-hand flange 1. A pair of valve chest plates 5 are secured on the inner faces of the flanges 1 and have semicircularly recessed lower ends secured to the associated rings 3 and 4. A U-shaped band 6 is secured between the side edges of the valve chest plates 5 and between the lower portions of the rings 3 and 4.

A gate blade 21 projects into the valve body, which valve body may be considered as including the flanges 1, the chest plates 5, the band 6 and the rings 3 and 4. The gate blade has the right-hand side surface thereof, as the parts are depicted in Fig. 2, disposed in sliding sealing engagement with a valve seat provided by the ring 4 to control the flow of fluid through the valve. The rings 3 and 4 together with the band 6 may be considered as providing a fluid passage through the valve.

An arcuate backing member 7 is secured to the inner surface of ring 3 but has free end portions 7a bent to engage the gate blade 21 and press it against the seat provided by the ring 4. This arcuate backing member forms the subject matter of my application entitled "Stock Valve Having Yieldable Gate Engaging Elements," Serial No. 423,114, filed April 14, 1954.

Surrounding the portion of the gate blade projecting from the valve body is a packing box unit, which includes an inverted box provided by a rectangular loop 8 and a top plate 9. The box contains packing 20 which is pressed into engagement with the upper edges of the chest portion of the valve body, that is, in engagement with the upper edges of the chest plates 5 and the upper ends of the U-shaped band 6. Preferably, the upper margins of the chest plates 5 are bent outwardly, as shown in Fig. 2, and it will be noted that these edges are disposed in spaced relation to the box 8, 9. This provides for lateral shifting movement or adjustment of the box relative to the valve body. The just-mentioned edges may be considered as an upstanding rib surrounding the gate blade.

Figure 3:
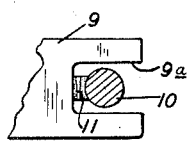
Fig. 3 is a fragmentary view in section taken along lines 3—3 of Fig. 1.

The top plate 9 has end portions projecting outwardly of the valve body and formed with slots 9a through which project studs 10 which are secured at their lowers ends by lugs 11 to the valve body. As clearly shown in Fig. 3, there is clearance between the studs 10 and the slots 9a to provide for shifting movement or adjustment of the packing box unit relative to the valve body. Nuts 10a are threaded on the upper ends of the studs 10 and force the packing box unit downwardly to press the packing 20 into engagement with the upper edges of the chest portion of the valve body.

A pair of arms 12 have their lower ends secured by bolts 18 to the upward projecting portions 2 of the valve flanges 1. The upper ends of the arms 12 are connected together by a yoke hub 13, there being a handwheel 14 having a nut 15 rotatably mounted on the hub 13. A valve stem 16 threadedly extends through the nut 15 and is connected by a clevis and bolt arrangement at 17 to the upper end of the gate blade 21.

With the valve of the present invention, it is unnecessary to be concerned with any critical alignment between a valve seat and a fixed packing box as heretofore has been necessary. When the valve of the present invention is assembled, the nuts 10a are left loose until after the gate blade 21 has been moved to its fully closed position, as shown in Fig. 2, where the fingers 7a press the gate blade into proper tight sealing engagement with the valve seat provided by the ring 4. During this time the packing box unit may freely shift relative to the valve body to bring it to the proper position for the desired fit of the gate blade against the valve seat. Thereafter the nuts 10a may be tightened to maintain this position of the packing box unit. In the event of wear between the gate blade and the valve seat, the nuts 10a may be loosened and the gate blade permitted to assume a tight sealing position against the valve seat whereupon the nuts 10a may again be tightened.

The particular valve shown is ideally suited for handling paper stock. An inexpensive valve for handling corrosive liquids may readily be provided by forming the chest plates 5, the band 6, the rings 3 and 4, the backing member 7 and the gate blade 21 of corrosion resistant metal such as stainless steel. The heavy flanges can be made of mild steel or other noncorrosion resistant metal, and these flanges serve to reinforce the relatively thin but expensive chest plates.

Having described the invention in what is considered to be the preferred embodiment thereof, it is desired that it be understood that the invention is not to be limited other than by the provisions of the following claims.

I claim:

1. A gate valve comprising a valve body having a fluid passage therethrough, a valve seat on the body, a gate blade projecting into the valve body for engagement with said valve seat to control the flow of fluid through said passage, said valve body providing a continuous portion surrounding said gate blade at the place where the gate blade projects from the valve body, a packing box unit surrounding said blade at said place, said packing box unit including a box separate from said body and having a recess facing in the direction of said body and packing in said recess engaging said continuous portion to form a seal therewith, and means providing for adjustment of said box in a direction normal to the plane of said blade to facilitate proper seating of said blade against said valve seat.

2. A gate valve comprising a valve body having a fluid passage therethrough, a valve seat on said body, a gate blade projecting into said body for engagement with said valve seat to control the flow of fluid through said passage, a packing box unit including an inverted box having side walls and an end wall, said end wall having a slot formed therein in spaced relation to said side walls and through which said blade extends, said end wall being disposed remote from said valve body, packing within said box facing said valve body, said valve body having a continuous rib portion surrounding said gate blade at the place where said blade projects from said valve body, and means for forcing said packing box unit toward said valve body to force said packing into engagement with said continuous rib portion, the edges of said packing box adjacent said continuous rib portion being disposed in spaced relation with respect thereto to provide for lateral shifting movement of said box relative to said body to a position wherein a desired alignment is established between said box and the valve seat.

3. A gate valve comprising a valve body having a fluid passage therethrough, a valve seat on said body, a gate blade projecting into said body for engagement with said valve seat to control the flow of fluid through said passage, a packing box unit having an opening through which said blade projects, said packing box unit including an inverted box, packing within said box facing said valve body, said valve body having a continuous rib surrounding said gate blade at the place where said blade projects from said valve body, and means for forcing said packing box unit toward said valve body to force said packing into sealing engagement with said rib, the edges of said packing box adjacent said rib being disposed in spaced relation surrounding said rib to provide for shifting movement of said box relative to said body to a position wherein a desired alignment is established between said box and the valve seat, said means adjustably connecting said packing box to said body to provide for shifting movement of said packing box unit in a direction normal to the direction of movement of said gate blade at a time when said means is in a condition releasing said packing from tight engagement with said rib.

4. A gate valve comprising a valve body having a fluid passageway therethrough, a valve seat in said body, a gate blade for seating against said seat and having a portion projecting from said body, said body providing an upstanding edge around said blade portion, a packing box separate from said body and surrounding said blade portion, packing in said box engaging said edge, and means providing for adjustment of said box in a direction normal to the plane of said blade to facilitate proper seating of said blade against said valve seat.

5. A gate valve comprising a valve body having a fluid passageway therethrough, a gate blade having a portion within said body and a portion projecting from said body, said body providing an upstanding edge around said blade at the place said blade projects from said body, a packing box separate from said body and surrounding said blade, packing carried by said box engaging said edge, and means providing for adjustment of said box and thus the packing carried thereby in a direction normal to the plane of said blade to enable said blade to be arranged in a predetermined relation with respect to said valve body.

6. A gate valve comprising a valve body having a flow passage, a valve seat in said body, a gate blade for seating against said seat and having a portion projecting from said body, an inverted packing box separate from said body and surrounding said blade at the place it projects from said body, packing carried by said box and engaging said body in surrounding relation to said blade at said place, and means providing for adjustment of said box and thus the packing carried thereby in a direction normal to the plane of said blade to facilitate proper seating of said blade against said valve seat.

7. A gate valve comprising a valve body having a fluid passage therethrough, a gate blade having a portion within said body and a portion projecting from said body, an inverted packing box separate from said body and surrounding said blade at the place said blade projects from said body, packing carried by said box and engaging said body in surrounding relation to said blade at said place, and means providing for adjustment of said box and thus the packing carried thereby in a direction normal to the plane of said blade to enable said blade to be arranged in a predetermined position relative to said valve body.

8. A gate valve comprising a valve body having a fluid passage therethrough including a valve seat, a gate blade projecting into the valve body engageable with said seat to control the flow of fluid through said passage, said valve body providing a continuous upstanding rib surrounding said gate blade at the place where the blade projects from said valve body, an inverted packing box separate from said body and surrounding said blade at the place said blade projects from said body, said box having side walls and end walls and a top wall, said side and end walls being dimensioned to provide a lower margin overlapping the rib, said top wall being remote from said body and having a slot through which said blade extends, said side and end walls being spaced from said blade to provide a packing recess, and packing occupying said recess and surrounding said blade and engaging said rib, and means for forcing said box and its packing toward said body to effect a seal between said packing and said rib.

References Cited in the file of this patent

UNITED STATES PATENTS

| | | |
|---|---|---|
| 2,064,567 | Riley | Dec. 15, 1936 |
| 2,669,416 | Hilton | Feb. 16, 1954 |
| 2,720,379 | Williams | Oct. 11, 1955 |